US012585910B2

(12) United States Patent
Kajikiya et al.

(10) Patent No.: US 12,585,910 B2
(45) Date of Patent: Mar. 24, 2026

(54) IC CARD

(71) Applicant: TDK Corporation, Tokyo (JP)

(72) Inventors: Shoma Kajikiya, Tokyo (JP); Makoto Hiraki, Tokyo (JP); Toshio Tomonari, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 19/257,547

(22) Filed: Jul. 2, 2025

(65) Prior Publication Data

US 2026/0010754 A1     Jan. 8, 2026

(30) Foreign Application Priority Data

Jul. 3, 2024     (JP) ................................. 2024-107278

(51) Int. Cl.
*G06K 19/077*     (2006.01)
*H01Q 1/22*     (2006.01)
(52) U.S. Cl.
CPC . *G06K 19/07781* (2013.01); *G06K 19/07794* (2013.01); *H01Q 1/22* (2013.01)

(58) Field of Classification Search
CPC ................... G06K 19/07781; G06K 19/07794
USPC ......................................................... 235/492
See application file for complete search history.

(56) References Cited

U.S. PATENT DOCUMENTS

2018/0339503 A1*  11/2018  Finn ..................... H01Q 1/2225
2022/0138522 A1    5/2022  Lotya et al.
2023/0027761 A1    1/2023  Kim

FOREIGN PATENT DOCUMENTS

JP        2023-010670 A     1/2023

* cited by examiner

*Primary Examiner* — Toan C Ly
(74) *Attorney, Agent, or Firm* — XSENSUS LLP

(57)     ABSTRACT

An IC card includes a metal plate having a through hole penetrating therethrough in one direction, a support member disposed inside the through hole and made of a magnetic material, and an IC module supported inside the through hole by the support member. The IC module has a coupling coil. The support member has a cavity penetrating therethrough in the one direction and accommodating a part of the IC module.

8 Claims, 17 Drawing Sheets

IC CARD

CROSS-REFERENCE TO RELATED APPLICATION

This application claims the benefit of Japanese Patent Application No. 2024-107278, filed on Jul. 3, 2024, the entire disclosure of which is incorporated by reference herein.

BACKGROUND

The present disclosure relates to an IC card.

JP 2023-010670A discloses an IC card including a metal layer having a COB (Chip On Board) cavity, a COB housed in the COB cavity, and an antenna coil. In the COB cavity, the COB is held in place by a PVC insert, and the antenna coil provided on the antenna inlay layer and the COB are directly connected via the COB contact area.

SUMMARY

An IC card according to an embodiment of the present disclosure includes: a metal plate having a first through hole penetrating therethrough in the thickness direction; a support member disposed at least partially inside the first through hole; and an IC module supported inside the first through hole by the support member, wherein the IC module has a coupling coil, and the support member is made of a magnetic material and has a cavity penetrating therethrough in a thickness direction and accommodating a part of the IC module.

BRIEF DESCRIPTION OF THE DRAWINGS

The above features and advantages of the present disclosure will be more apparent from the following description of certain preferred embodiments taken in conjunction with the accompanying drawings, in which.

DETAILED DESCRIPTION OF THE EMBODIMENTS

When magnetic coupling is to be established between an IC module such as a COB and an antenna coil without physical contact, the proximity of the IC module to a metal member such as a metal plate may disadvantageously cause the self-resonant frequency (SRF) of a coupling coil provided in the IC module to become higher than its design value.

The present disclosure describes a technique for adjusting the self-resonant frequency of a coupling coil provided in an IC module, in an IC card including a metal plate.

Hereinafter, preferred embodiments of the present disclosure will be described in detail below with reference to the accompanying drawings.

Figure 1:
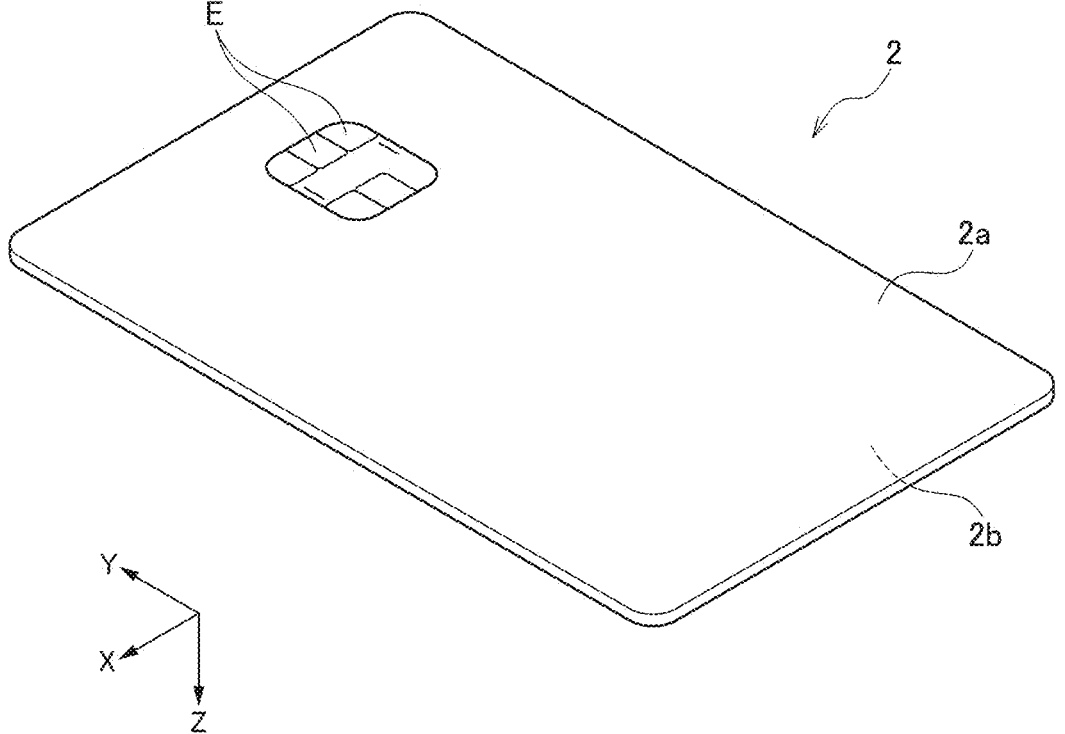
FIG. 1 is a schematic perspective view illustrating the outer appearance of an IC card 2 according to a first embodiment of the present disclosure.

FIG. 1 is a schematic perspective view illustrating the outer appearance of an IC card 2 according to a first embodiment of the present disclosure.

As illustrated in FIG. 1, the IC card 2 according to the first embodiment has a plate-like shape in which the Y-, X-, and Z-directions are defined as the longer length direction, shorter length direction, and thickness direction, respectively, and has an upper surface 2a and a back surface 2b which constitute the XY plane. The IC card 2 embeds therein an IC module to be described later whose terminal electrode E is exposed on the upper surface 2a of the IC card 2.

Figure 2:
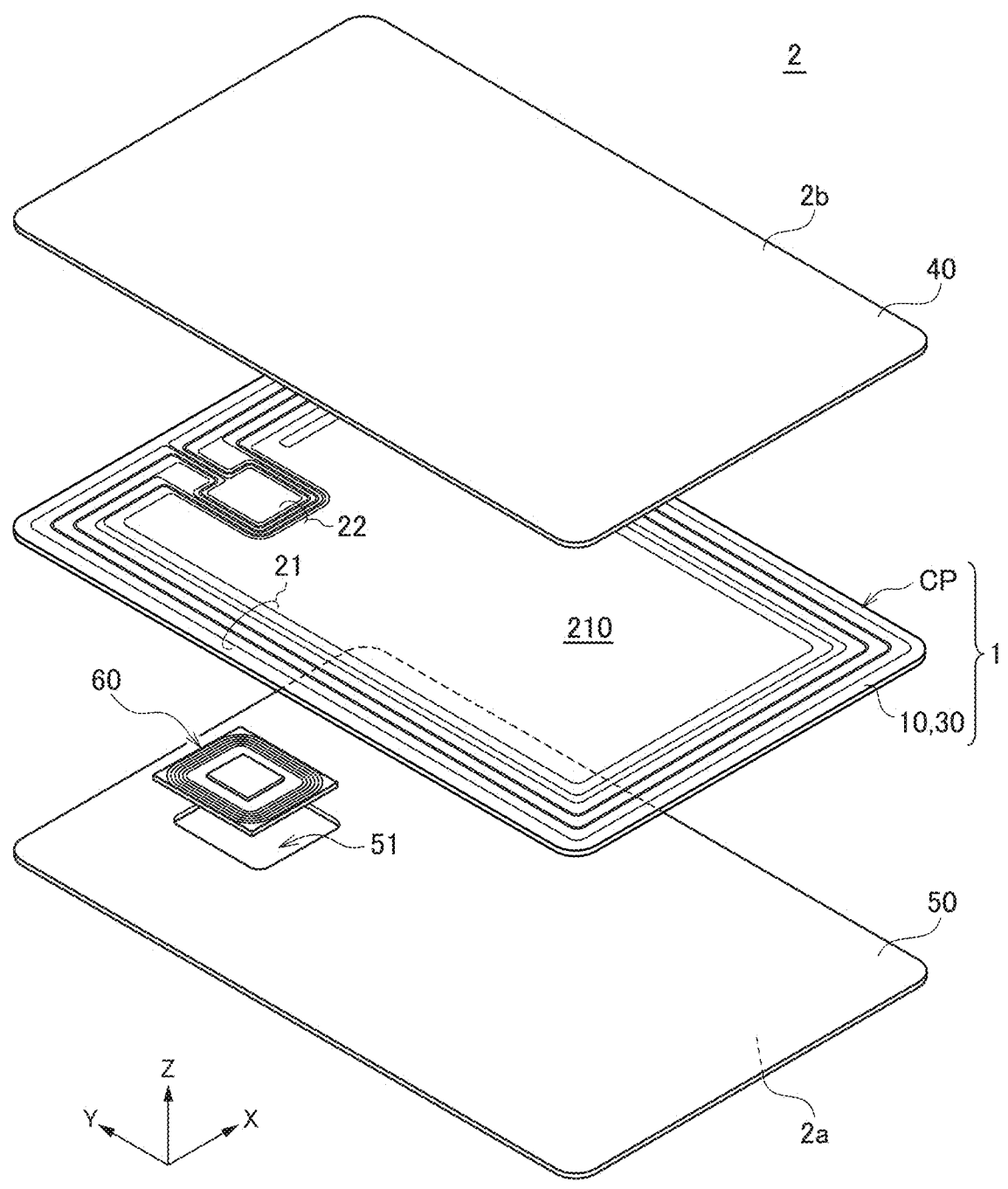
FIG. 2 is a schematic exploded perspective view for explaining the structure of the IC card 2.
Figure 3:
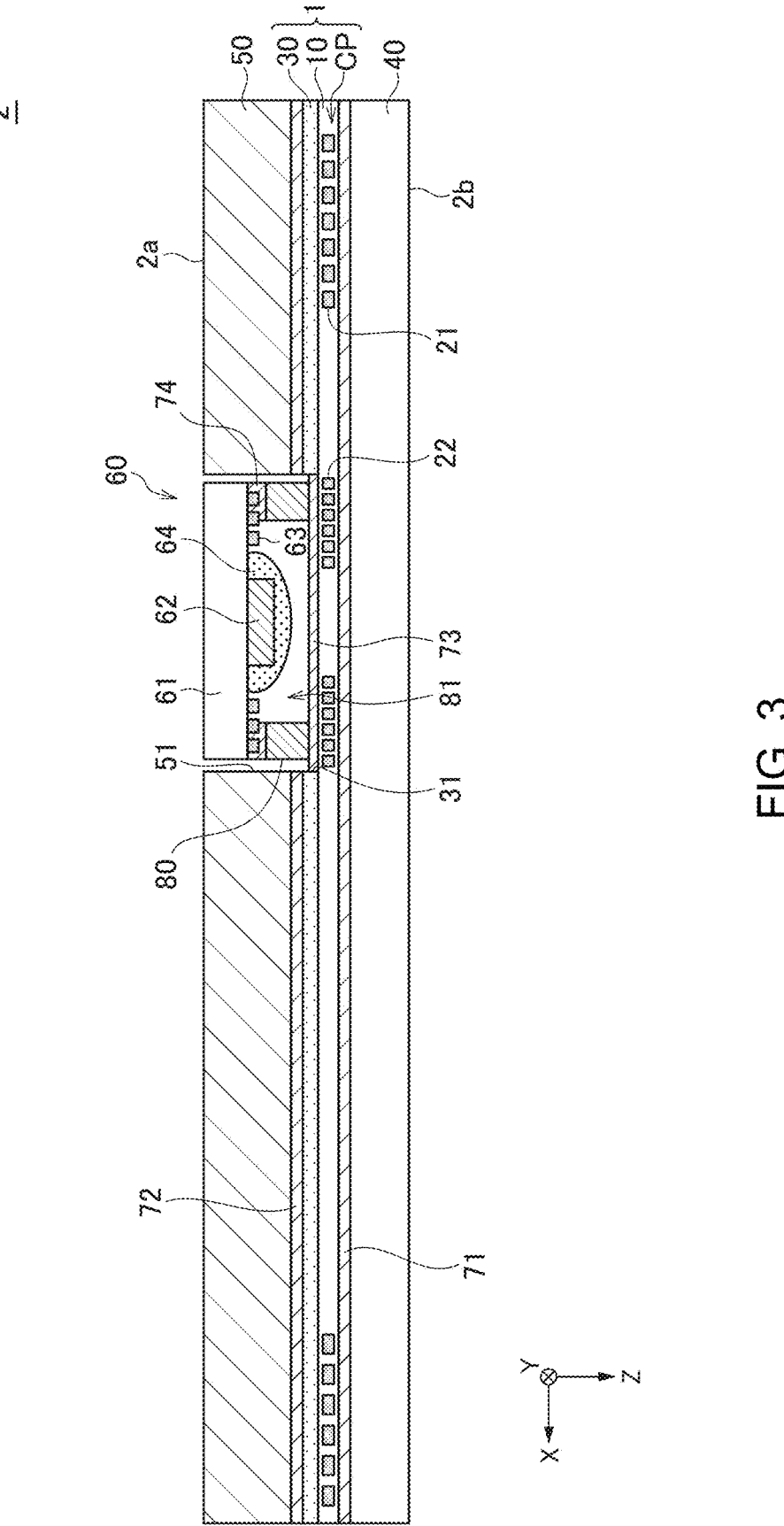
FIG. 3 is a schematic cross-sectional view for explaining the structure of the IC card 2.

FIGS. 2 and 3 are respectively a schematic exploded perspective view and a schematic cross-sectional view for explaining the structure of the IC card 2 according to the first embodiment.

As illustrated in FIGS. 2 and 3, the IC card 2 according to the first embodiment has a structure in which a plastic plate 40, a coil component 1, and a metal plate 50 are laminated in this order from the back surface 2b side to the upper surface 2a side. The coil component 1 includes a magnetic body 30, a coil pattern CP, and a resin layer 10. The coil pattern CP and resin layer 10 are disposed on one surface side of the magnetic body 30 in the positive Z-direction. The coil pattern CP may be embedded in the resin layer 10. The other surface of the magnetic body 30 in the negative Z-direction is covered with the metal plate 50. The magnetic body 30 may be a sheet-like member.

The magnetic body 30 and metal plate 50 respectively have a through hole 31 and a through hole 51. The through holes 31 and 51 overlap each other in the Z-direction as the lamination direction. The plastic plate 40 and coil component 1 are bonded together through an adhesive layer 71. The metal plate 50 and coil component 1 are bonded together through an adhesive layer 72. Examples of the material of the adhesive layers 71 and 72 include an acrylic-based double-sided tape, a thermosetting resin, and a thermoplastic resin.

The plastic plate 40 is made of a resin material not blocking magnetic flux. The outer surface of the plastic plate 40 constitutes the back surface 2b of the IC card 2. The metal plate 50 is made of a metal material such as stainless steel or titanium. The outer surface of the metal plate 50 constitutes the upper surface 2a of the IC card 2. The metal plate 50 has the through hole 51, inside of which at least a part of a support member 80 and an IC module 60 are disposed. As described above, the IC card 2 according to the present embodiment is a card using a metal plate as its main body.

As illustrated in FIGS. 2 and 3, the coil pattern CP is formed from a conductor pattern wound in a plurality of turns. Each of the plurality of turns constituting the coil pattern CP has a first winding part 21 wound in a first direction along the outer edge of the magnetic body 30 so as to overlap the magnetic body 30 and a second winding part 22 positioned in an opening region 210 surrounded by the first winding part 21 and wound in a second direction opposite to the first direction. The second winding part 22 of the coil pattern CP overlaps at least partially the through hole 31 of the magnetic body 30. As a result, the second winding part 22 of the coil pattern CP overlaps partially the IC module 60 disposed inside the through hole 51 of the metal plate 50 in the Z-direction through the through hole 31 of the magnetic body 30.

The first winding part 21 of the coil pattern CP functions as an antenna coil magnetically coupled to an external card reader in actual use. The second winding part 22 of the coil pattern CP functions as a coupling coil magnetically coupled to the IC module 60. The second winding part 22 may function as a part of the antenna coil magnetically coupled to an external card reader. By setting the resonance frequency of the coil pattern CP to 13.56 MHz or a frequency band around 13.56 MHZ, NFC (Near Field Communication) between an external card reader and the IC card 2 is enabled.

Figure 4:
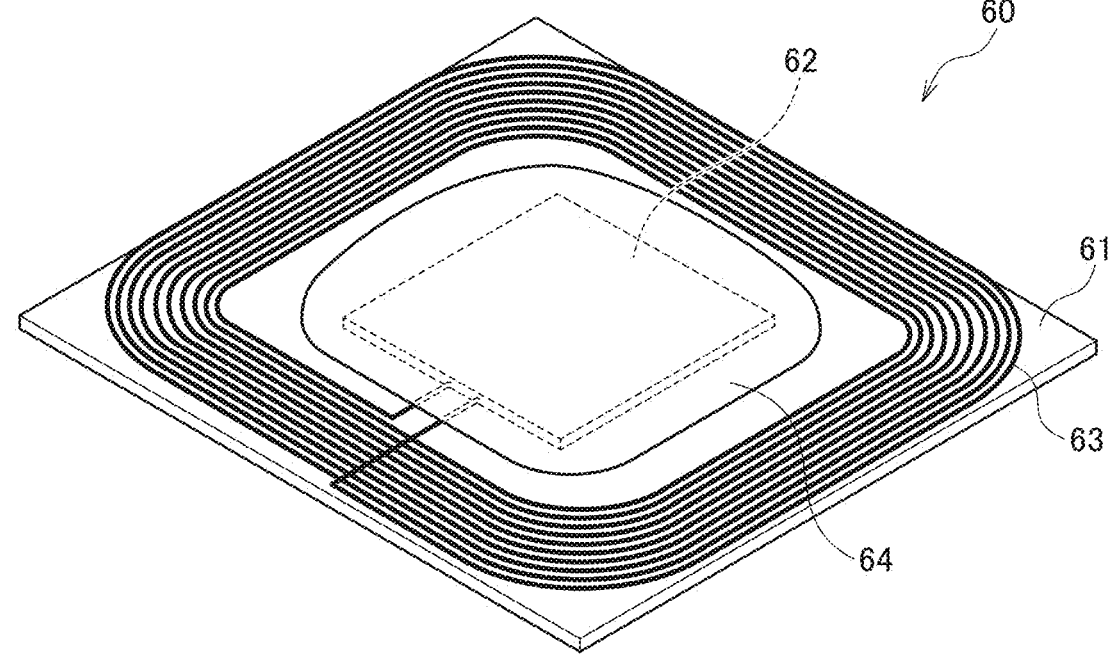
FIG. 4 is a schematic perspective view of the IC module 60 as seen from the back surface side thereof.

FIG. 4 is a schematic perspective view of the IC module 60 as seen from the back surface side thereof.

As illustrated in FIG. 4, the IC module 60 includes a module substrate 61, an IC chip 62 mounted on or embedded in the module substrate 61, and a coupling coil 63. The IC chip 62 is protected by being covered with a dome-shaped protective resin 64. The protective resin 64 is made of an insulating member. The terminal electrode E illustrated in FIG. 1 is provided on the front surface side of the module substrate 61. The IC module 60 thus configured is accommodated inside the through hole 51 formed in the metal plate 50 and supported by the support member 80. In a state where the IC module 60 is accommodated inside the through hole 51, the coupling coil 63 and the second winding part 22 constituting a part of the coil pattern CP are magnetically coupled to each other. Since the second winding part 22 of the coil pattern CP is connected to the first winding part 21 constituting another part of the coil pattern CP and functioning as an antenna coil, the IC module 60 can communicate with an external device through the first winding part 21 of the coil pattern CP.

Figure 5:
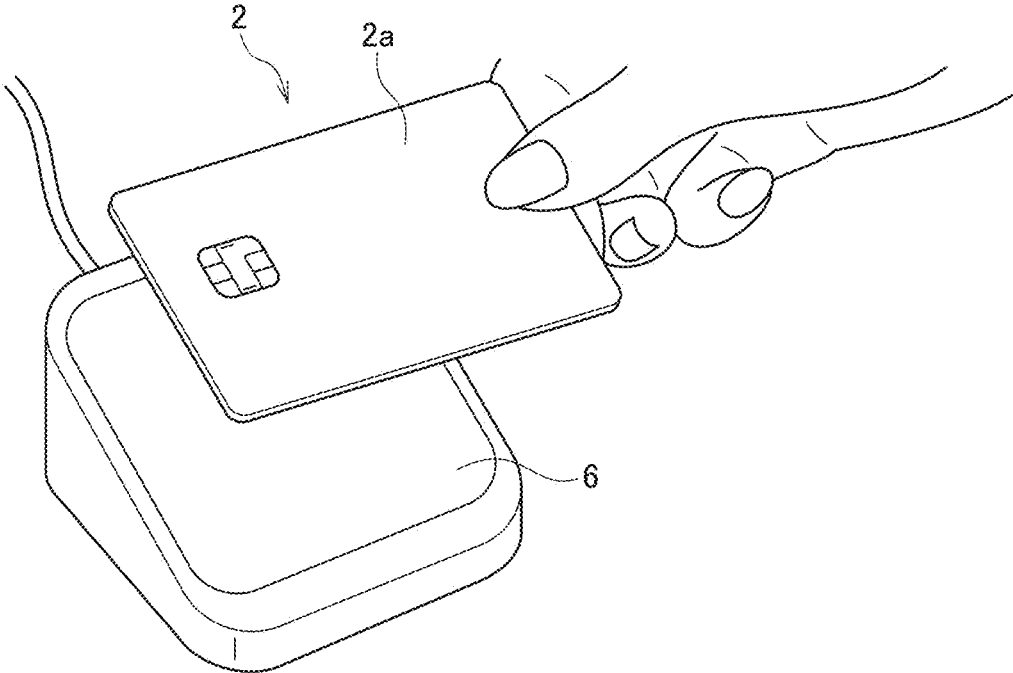
FIG. 5 is a schematic diagram showing a state in which the IC card 2 and the card reader 6 communicate with each other.

Thus, as illustrated in FIG. 5, when the back surface 2b of the IC card 2 is made to face a card reader 6, communication can be performed between the card reader 6 and the IC chip 62. That is, the card reader 6 is magnetically coupled to the coupling coil 63 of the IC module 60 through the coil pattern CP and can thereby communicate with the IC chip 62.

FIG. 6 is a view for explaining the structure of the support member 80 accommodated inside the through hole 51 of the metal plate 50, where (a) is a schematic perspective view, and (b) is a schematic cross-sectional view.

Figures 6A, 6B:
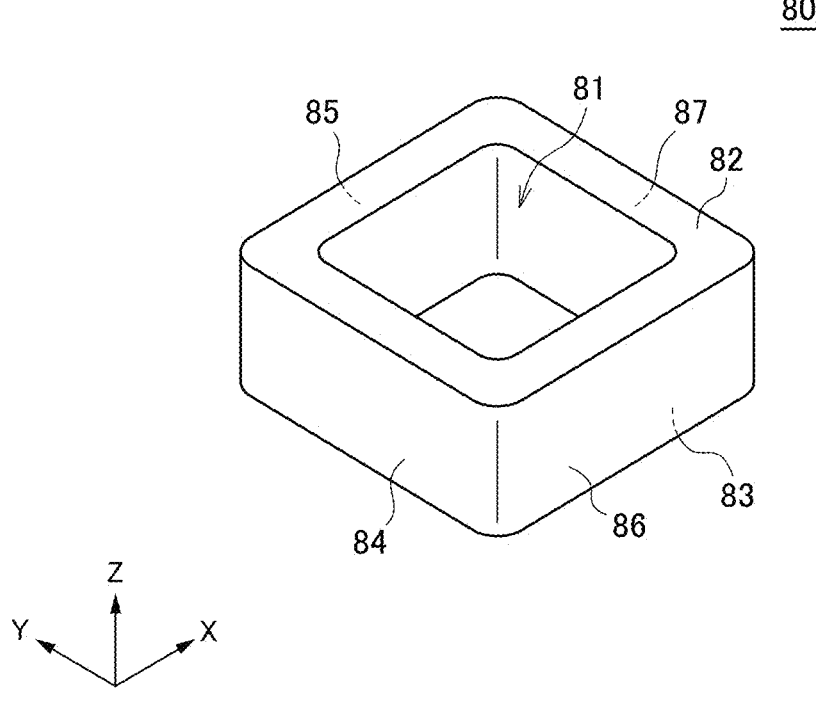
FIG. 6A is a schematic perspective 1 view for explaining the structure of the support member 80.
FIG. 6B is a schematic cross-sectional view for explaining the structure of the support member 80.

The support member 80 is a single member made of a magnetic material and used to support the IC module 60 inside the through hole 51 of the metal plate 50. The support member 80 may be constituted by a plurality of members made of a magnetic material; however, when it is constituted by a single member, stability thereof is enhanced to stabilize the mounting position of the IC module 60. The magnetic material constituting the support member 80 may be made of a bulk ferrite sintered body or a composite magnetic material containing flat magnetic powder or metal magnetic powder and resin binder. When the support member 80 is made of a bulk ferrite sintered body, an insulating coating 89 is provided on the surface of the support member 80 as illustrated in FIG. 6(b), whereby the detachment and diffusion of ferrite fine particles can be prevented.

For example, the IC module 60 is inserted into the through hole 51 of the metal plate 50 while being bonded to and supported by the support member 80. The support member 80 may be completely or only partially placed inside the through hole 51 of the metal plate 50. As illustrated in FIG. 6(a), the support member 80 has a substantially rectangular parallelepiped outer shape, has a cylindrical shape, and has a cavity 81 penetrating therethrough in the Z-direction. More specifically, the support member 80 has upper and lower surfaces 82 and 83 constituting the XY plane and located on mutually opposite sides, side surfaces 84 and 87 constituting the YZ plane and located on mutually opposite sides, and side surfaces 85 and 86 constituting the XZ plane and located on mutually opposite sides. The cavity 81 penetrates through the support member 80 from the center of the upper surface 82 to the center of the lower surface 83.

As illustrated in FIG. 3, a part of the IC module 60, for example, a part of the protective resin 64 is accommodated in the cavity 81 of the support member 80. The upper surface 82 of the support member 80 is bonded to the resin layer 10 through an adhesive layer 73 provided at a position overlapping the through hole 51 of the metal plate 50 and the through hole 31 of the magnetic body 30. The lower surface 83 of the support member 80 is bonded to the module substrate 61 of the IC module 60 through an adhesive layer 74 made of hot-melt resin.

As described above, in the present embodiment, the support member 80 made of a magnetic material is present on the magnetic path between the second winding part 22 of the coil pattern CP and the coupling coil 63 of the IC module 60. When a magnetic material is thus present between the second winding part 22 of the coil pattern CP and the coupling coil 63 of the IC module 60, the self-resonance frequencies (SRFs) of the second winding part 22 of the coil pattern CP and the coupling coil 63 of the IC module 60 decrease. On the other hand, the second winding part 22 of the coil pattern CP and the coupling coil 63 of the IC module 60 have self-resonance frequencies higher than their design values when they are in proximity to the metal plate 50. This cancels out the variations in the self-resonance frequencies, f with the result that it is possible to obtain self-resonance frequencies close to design values. Further, in the present embodiment, since the support member 80 is a singe member, the number of components can be reduced.

Figures 7A, 7B:
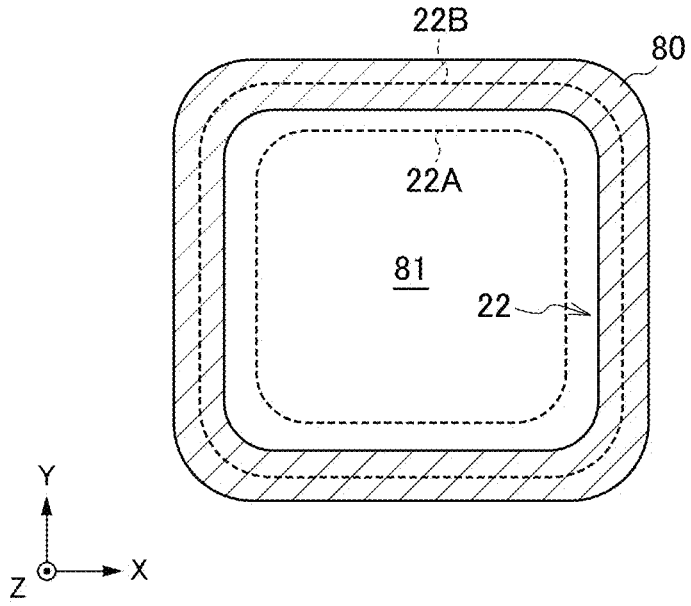
FIG. 7A is a schematic view for explaining a first example of the positional relationship between the support member 80 and the second winding part 22 of the coil pattern CP.
FIG. 7B is a schematic view for explaining a first example of the positional relationship between the support member 80 and the coupling coil 63 of the IC module 60.

FIG. 7(*a*) is a schematic view for explaining a first example of the positional relationship between the support member 80 and the second winding part 22 of the coil pattern CP. FIG. 7(*b*) is a schematic view for explaining a first example of the positional relationship between the support member 80 and the coupling coil 63 of the IC module 60.

In the first example illustrated in FIG. 7(*a*), in a plan view as seen from the Z-direction (thickness direction), an inner peripheral edge 22A of the second winding part 22 of the coil pattern CP overlaps the cavity 81 of the support member 80, while an outer peripheral edge 22B of the second winding part 22 overlaps the support member 80. In other words, as seen from the Z-direction, the inner wall of the cavity 81 of the support member 80 is located between the inner and outer peripheral edges 22A and 22B of the second winding part 22 of the coil pattern CP.

Similarly, in the first example illustrated in FIG. 7(*b*), in a plan view as seen from the Z-direction (thickness direction), an inner peripheral edge 63A of the coupling coil 63 of the IC module 60 overlaps the cavity 81 of the support member 80, while an outer peripheral edge 63B of the coupling coil 63 overlaps the support member 80. In other words, as seen from the Z-direction, the inner wall of the cavity 81 of the support member 80 is located between the inner and outer peripheral edges 63A and 63B of the coupling coil 63 of the IC module 60.

According to the positional relationship illustrated in FIGS. 7(*a*) and 7 (*b*), a majority of the magnetic flux linking with both the second winding part 22 of the coil pattern CP and the coupling coil 63 passes through the cavity 81 of the support member 80, so that it is possible to reduce the self-resonant frequency while establishing magnetic coupling between the second winding part 22 of the coil pattern CP and the coupling coil 63.

Figure 8A:
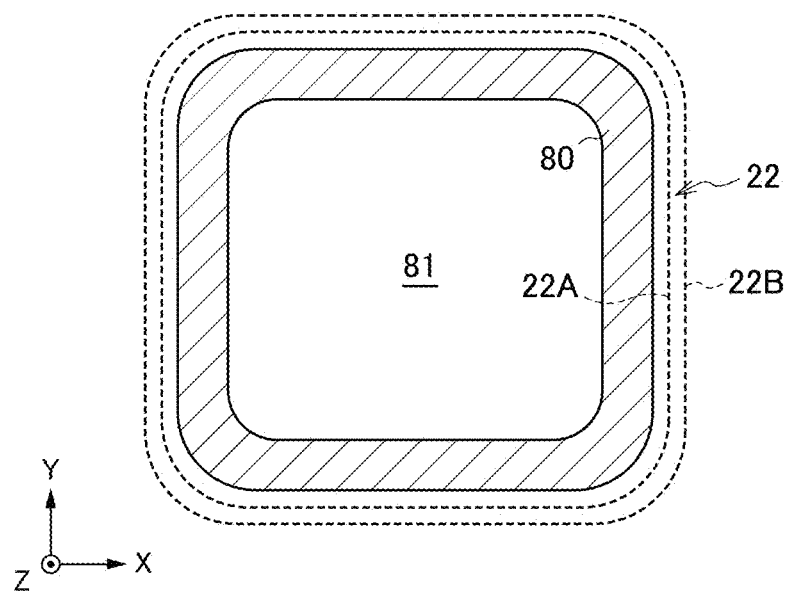
FIG. 8A is a schematic view for explaining a second example of the positional relationship between the support member 80 and the second winding part 22 of the coil pattern CP.
Figure 8B:
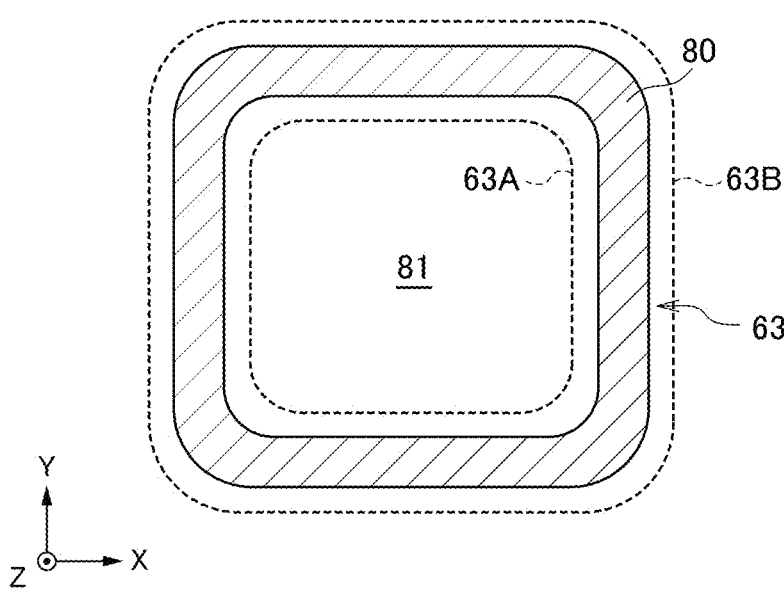
FIG. 8B is a schematic view for explaining a second example of the positional relationship between the support member 80 and the coupling coil 63 of the IC module 60.

FIG. 8(*a*) is a schematic view for explaining a second example of the positional relationship between the support member 80 and the second winding part 22 of the coil pattern CP. FIG. 8(*b*) is a schematic view for explaining a second example of the positional relationship between the support member 80 and the coupling coil 63 of the IC module 60.

In the second example illustrated in FIG. 8(*a*), in a plan view as seen from the Z-direction (thickness direction), the second winding part 22 of the coil pattern CP is entirely located outside the support member 80. In other words, as seen from the Z-direction, the support member 80 is located within the opening region surrounded by the second winding part 22 of the coil pattern CP. Further, both the inner and outer peripheral edges 22A and 22B of the second winding part 22 of the coil pattern CP are located outside the support member 80.

In the second example illustrated in FIG. 8(*b*), in a plan view as seen from the Z-direction (thickness direction), the inner peripheral edge 63A of the coupling coil 63 of the IC module 60 is located within the cavity 81 of the support member 80, while the outer peripheral edge 63B of the coupling coil 63 is located outside the support member 80. In other words, the entire support member 80 overlaps the coupling coil 63 of the IC module 60.

According to the positional relationship illustrated in FIGS. 8(*a*) and 8(*b*), a majority of the magnetic flux linking with both the second winding part 22 of the coil pattern CP and the coupling coil 63 passes outside the support member 80, so that it is possible to reduce the self-resonant frequency while establishing magnetic coupling between the second winding part 22 of the coil pattern CP and the coupling coil 63.

Figure 9:
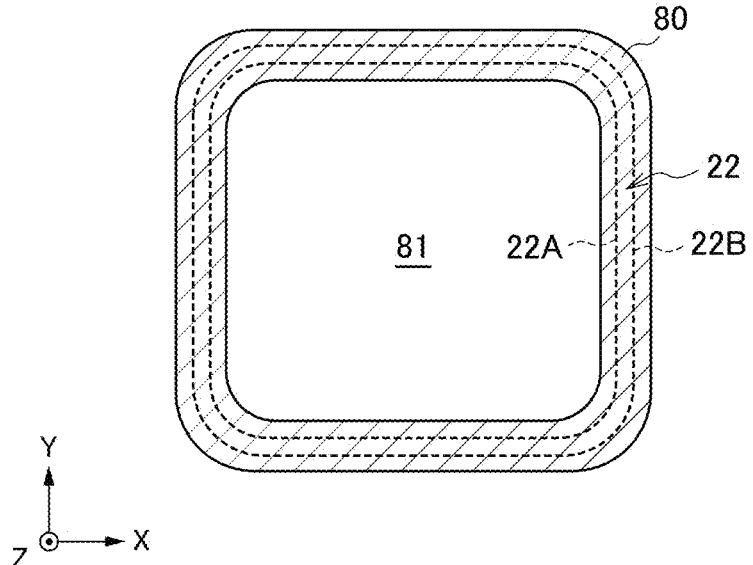
FIG. 9 is a schematic view for explaining a third example of the positional relationship between the support member 80 and the second winding part 22 of the coil pattern CP.

FIG. 9 is a schematic view for explaining a third example of the positional relationship between the support member 80 and the second winding part 22 of the coil pattern CP.

In the third example illustrated in FIG. 9, in a plan view as seen from the Z-direction (thickness direction), the entire second winding part 22 of the coil pattern CP overlaps the support member 80. In other words, both the inner and outer peripheral edges 22A and 22B of the coil pattern CP overlap the support member 80. When the positional relationship between the support member 80 and the second winding part 22 of the coil pattern CP is in accordance with the third example illustrated in FIG. 9, the positional relationship between the support member 80 and the coupling coil 63 of the IC module 60 may take the form of either the first example illustrated in FIG. 7(*b*) or the second example illustrated in FIG. 8(*b*).

In the third example illustrated in FIG. 9 as well, a portion of the magnetic flux linking with the second winding part 33 of the coil pattern CP and the coupling coil 63 passes outside the support member 80 and through the cavity 81, so that it is possible to reduce the self-resonant frequency while establishing magnetic coupling between the second winding part 22 of the coil pattern CP and the coupling coil 63. In addition, according to the third example illustrated in FIG. 9, a significant reduction in the self-resonant frequency can be achieved.

Figure 10:
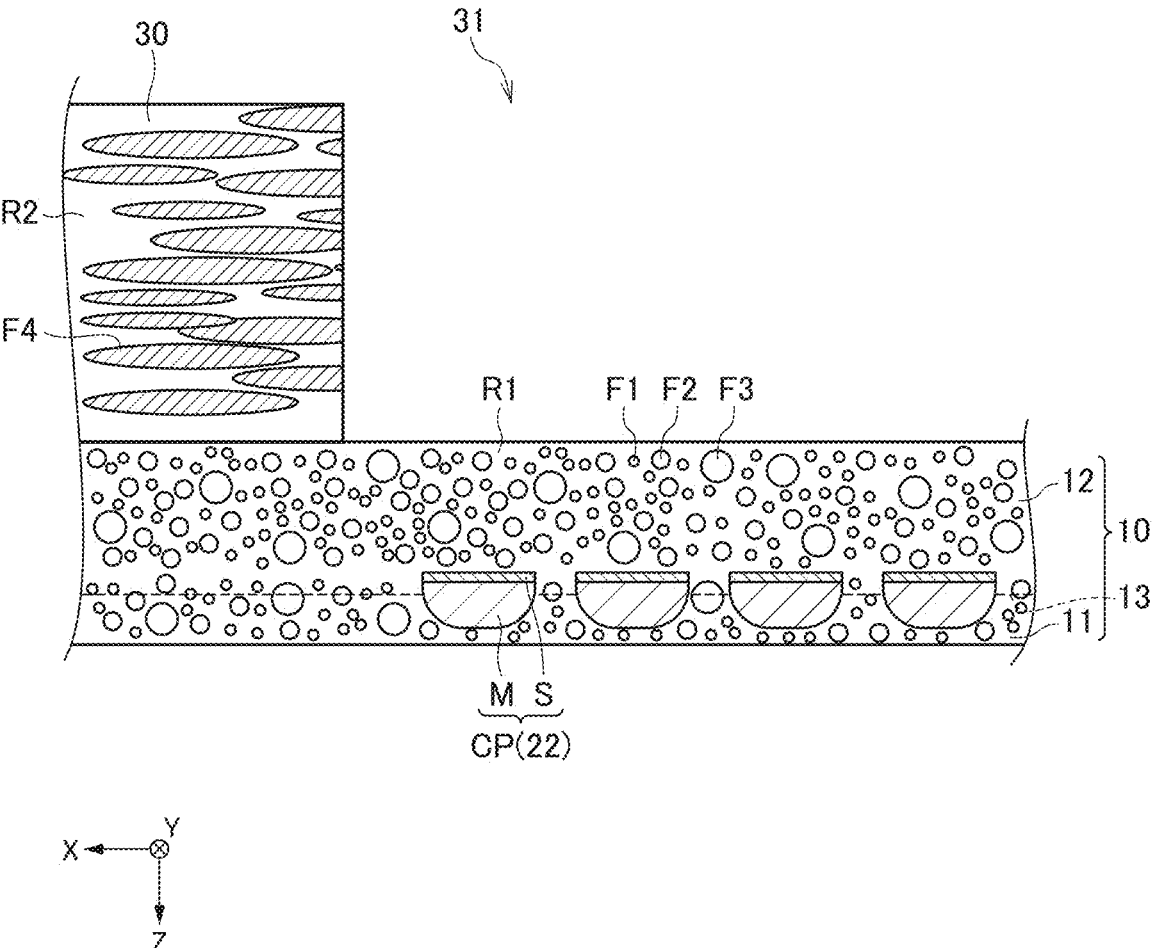
FIG. 10 is a schematic cross-sectional view for explaining the structures of the resin layer 10 and magnetic body 30.

FIG. 10 is a schematic cross-sectional view for explaining the structures of the resin layer 10 and magnetic body 30.

In the example illustrated in FIG. 10, the coil pattern CP is embedded in the resin layer 10. The resin layer 10 has a structure in which a first layer 11 and a second layer 12 are laminated in the Z-direction. When the first and second layers 11 and 12 are made of the same material, a boundary 13, which is the boundary therebetween, is not necessarily clear.

The coil pattern CP includes a seed part S and a main body part M. The seed part S contains resin. The main body part M is made of a metal material and laminated on the seed part S. The metal material constituting the main body part M may be Cu. The seed part S may contain a material functioning as a catalyst when the main body part M is formed by plating. The conductivity of the main body part M may be higher than that of the seed part S. The thickness of the main body part M may be larger than that of the seed part S. With this configuration, the resistance value of the coil pattern CP can be reduced. In the example illustrated in FIG. 10, the entire surface of the coil pattern CP is covered with the resin layer 10.

The coil pattern CP is formed on the surface of a not-shown substrate and embedded in the first layer 11, followed by removal of the substrate and formation of the second layer 12. The resin layer 10 may contain particles and binder resin R1. The particles contained in the resin layer 10 may be inorganic filler particles or black-colored pigment particles. The material of the inorganic filler particles may be a nonmagnetic inorganic material such as alumina, aluminum hydroxide, talc, magnesium hydroxide, silica, calcium carbonate, barium titanate, zirconium titanate, or zinc zirconate titanate. When inorganic filler particles are used as the particles contained in the resin layer 10, insulating inorganic filler particles F1 to F3 having mutually different particle diameters may be used. By thus using the three inorganic filler particles F1 to F3 having mutually different particle diameters, the filling rate of the inorganic filler particles in the resin layer 10 is increased.

The magnetic body 30 is used to prevent magnetic flux from being applied to the metal plate 50 by covering the first winding part 21 of the coil pattern CP. In at least a part of region overlapping the second winding part 22 of the coil pattern CP as a coupling coil, the magnetic body 30 is not provided, and the through hole 31 is formed instead. The magnetic body 30 may be a magnetic resin layer containing flat magnetic powders F4 and binder resin R2. The flat magnetic powders F4 may be made of a metal magnetic material such as sendust, permalloy, Fe—Si—Cr-based alloy magnetic body, Fe—Si—Al—Cr-based alloy magnetic body, or Fe—Al—Cr-based alloy magnetic body. The thickness direction of the flat magnetic powders F4 is the Z-direction, and the longer side direction thereof is the XY plane direction perpendicular to the Z-direction. The flat magnetic powders F4 are oriented such that the longer side direction thereof is substantially parallel to the XY plane direction. This increases the permeability of the magnetic body 30 in the XY plane direction.

Figure 11:
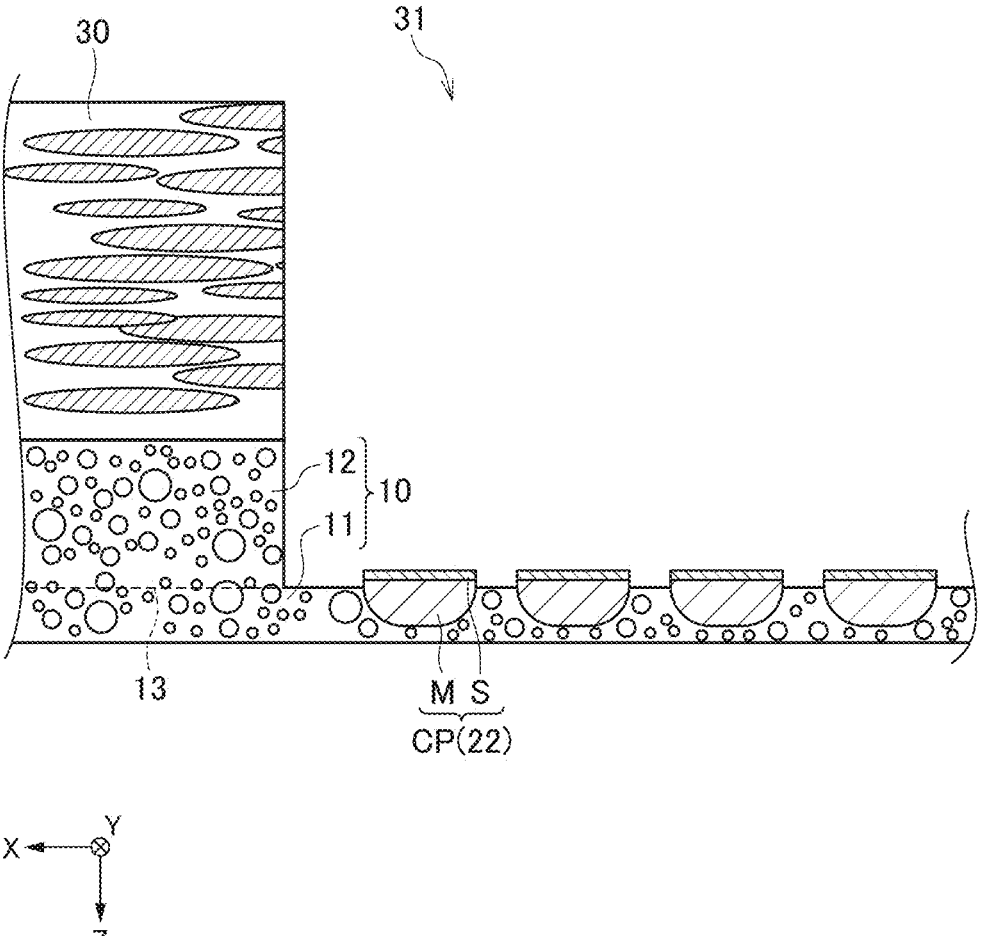
FIG. 11 is a schematic cross-sectional view for explaining the structures of the resin layer 10 and magnetic body 30 according to a modification.

FIG. 11 is a schematic cross-sectional view for explaining the structures of the resin layer 10 and magnetic body 30 according to a modification.

The modification illustrated in FIG. 11 differs from the structure illustrated in FIG. 10 in that the second layer 12 of the resin layer 10 is removed at the position overlapping the through hole 31 of the magnetic body 30. As a result, the second winding part 22 of the coil pattern CP is exposed from the resin layer 10. Other basic configurations are the same as those of the structure illustrated in FIG. 10, so the same reference numerals are given to the same elements, and overlapping description will be omitted. According to the structure illustrated in FIG. 11, it is possible to prevent interference between the IC module 60 and the resin layer 10 even when the IC module 60 is even thicker. The surface of the second winding part 22 of the coil pattern CP that is exposed from the resin layer 10 is constituted by the seed part S having a conductivity lower than that of the main body part M, so that a reduction in reliability due to the exposure of the coil pattern CP is reduced.

Figure 12:
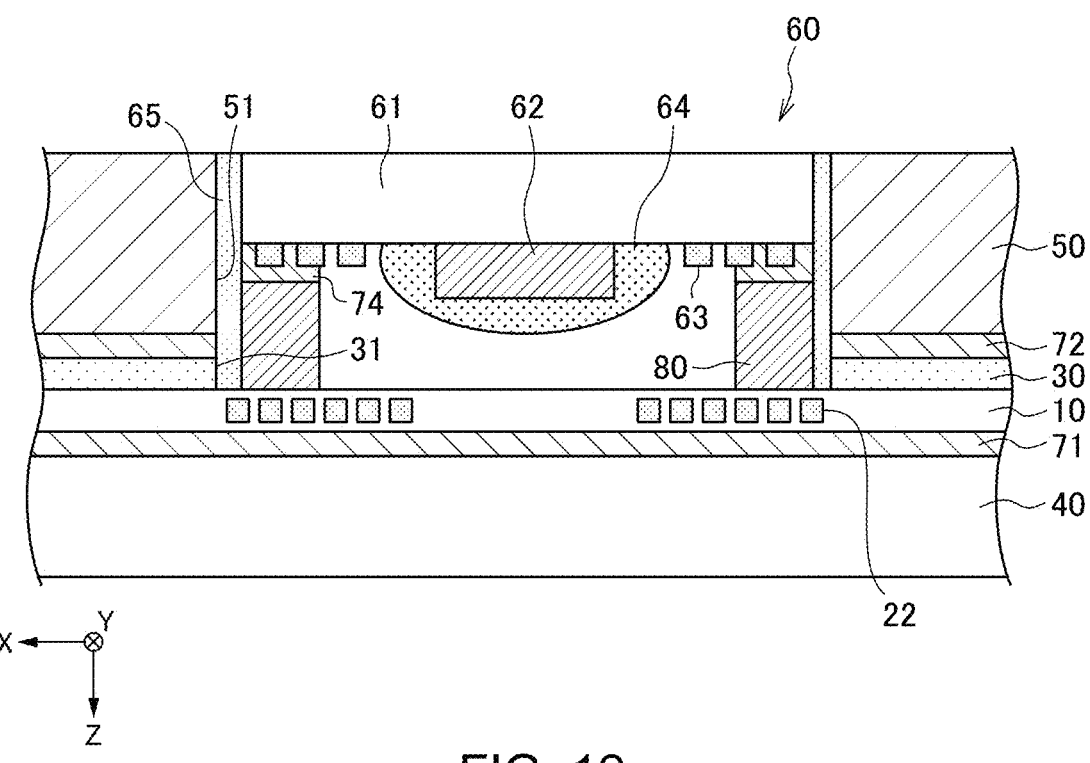
FIG. 12 is a schematic partial cross-sectional view illustrating a first modification of the IC module 60 and its surrounding structure.

FIG. 12 is a schematic partial cross-sectional view illustrating a first modification of the IC module 60 and its surrounding structure.

The first modification illustrated in FIG. 12 differs from the structure illustrated in FIG. 3 in that the adhesive layer 73 is omitted and that a resin member 65 is newly provided. Other basic configurations are the same as those of the structure illustrated in FIG. 3, so the same reference numerals are given to the same elements, and overlapping description will be omitted. The first modification illustrated in FIG. 12 is a structure applicable when, as illustrated in FIG. 10, at the position overlapping the through hole 31 of the magnetic body 30, the coil pattern CP is not exposed, and the binder resin R1 constituting the resin layer 10 and having adhesiveness over its entire surface is exposed. In this case, the support member 80 is directly bonded to the binder resin R1 of the resin layer 10. This eliminates the need for the adhesive layer 73 to be provided, allowing the thickness of the support member 80 to be increased by the thickness of the adhesive layer 73, which can further reduce the self-resonant frequency. On the other hand, as illustrated in FIG. 11, when the coil pattern CP is exposed at the position overlapping the through hole 31 of the magnetic body 30, bonding of the support member 80 can be achieved using the adhesive layer 73, as explained with reference to FIG. 3.

Further, in the first modification illustrated in FIG. 12, the resin member 65 is filled in the gap between the metal plate 50 and the support member 80 inside the through hole 51. The resin member 65 may be in contact with the magnetic body 30. Filling the resin member 65 into the through hole 51 allows the IC module 60 to be more securely fixed inside the through hole 51 and enhances insulation between the metal plate 50 and the support member 80.

Figure 13:
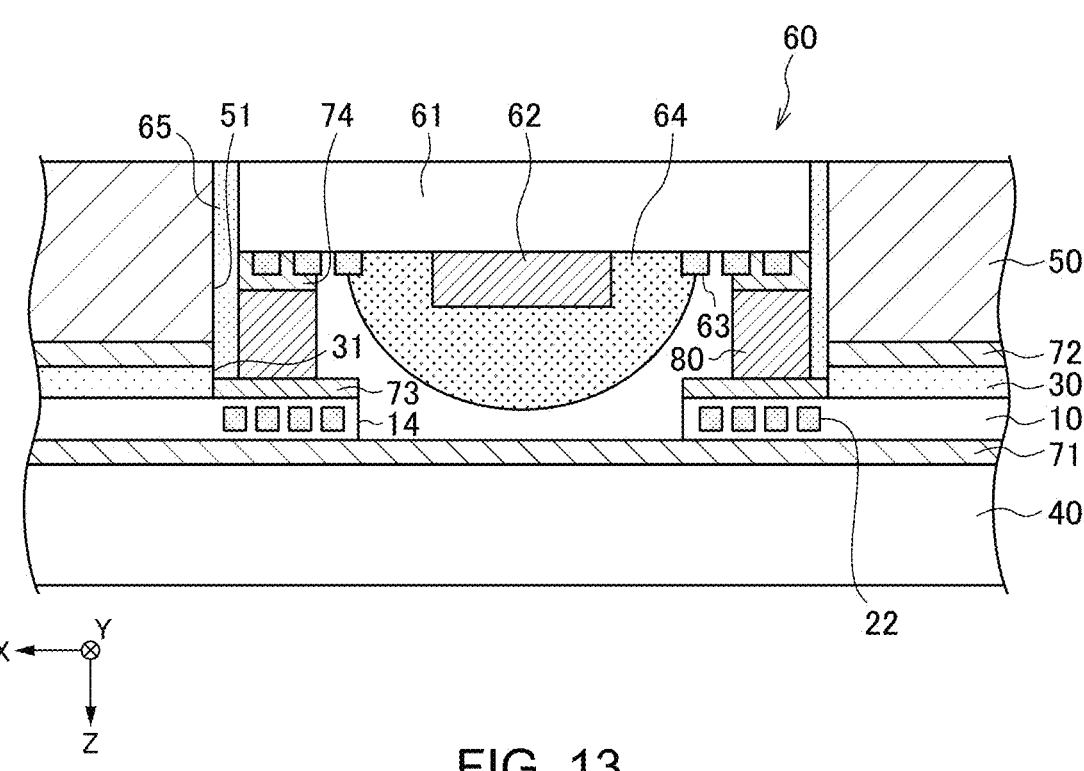
FIG. 13 is a schematic partial cross-sectional view illustrating a second modification of the IC module 60 and its surrounding structure.

FIG. 13 is a schematic partial cross-sectional view illustrating a second modification of the IC module 60 and its surrounding structure.

The second modification illustrated in FIG. 13 differs from the structure illustrated in FIG. 3 in that the adhesive layer 73 and resin layer 10 are partially removed at a position overlapping, in a plan view, the opening region surrounded by the second winding part 22 of the coil pattern CP, that a resin member 65 is provided, and that the size of the protective resin 64 is increased. Other basic configurations are the same as those of the structure illustrated in FIG. 3, so the same reference numerals are given to the same elements, and overlapping description will be omitted. A through hole 14 formed in the resin layer 10 overlaps the through hole 51 of the metal plate 50 and the through hole 31 of the magnetic body 30. According to the second modification illustrated in FIG. 13, even when the protective resin 64 of the IC module 60 has a large height in the Z-direction, interference between the protective resin 64 and the resin layer 10 can be prevented.

Figure 14:
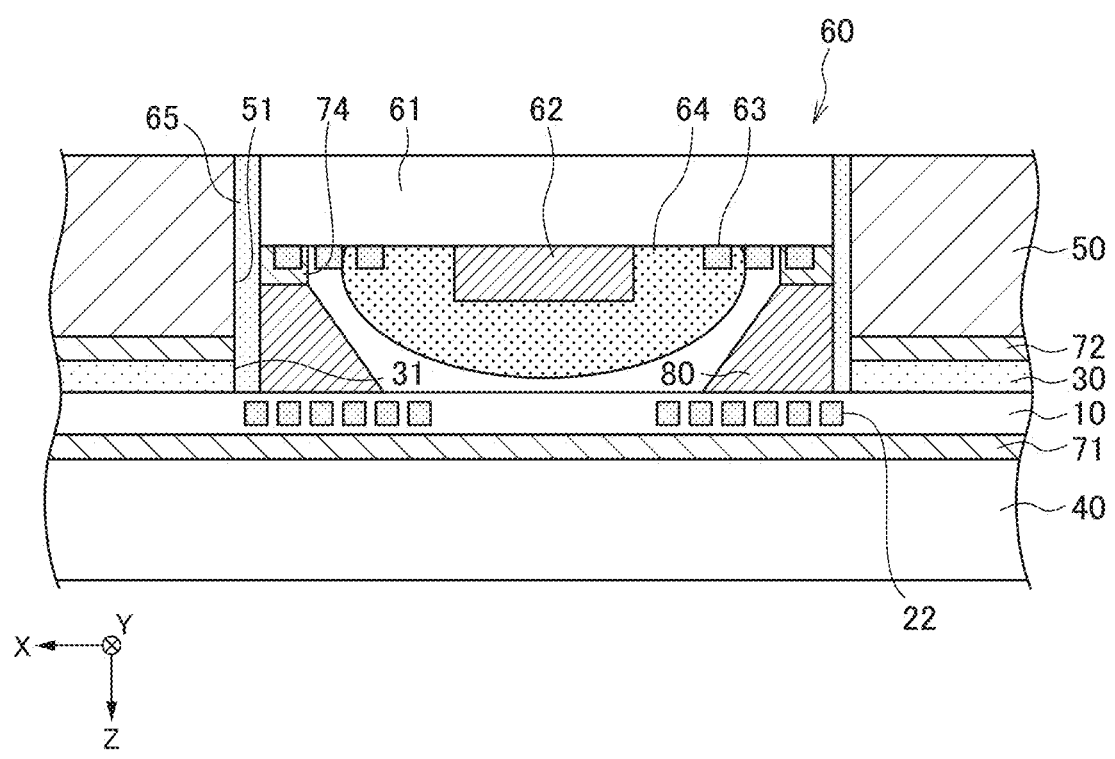
FIG. 14 is a schematic partial cross-sectional view illustrating a third modification of the IC module 60 and its surrounding structure.

FIG. 14 is a schematic partial cross-sectional view illustrating a third modification of the IC module 60 and its surrounding structure.

The third modification illustrated in FIG. 14 differs from the structure illustrated in FIG. 12 in that the cavity 81 of the support member 80 is tapered such that the inner diameter thereof increases toward the IC module 60 and that the protective resin 64 is larger in size. Other basic configurations are the same as those of the structure illustrated in FIG. 12, so the same reference numerals are given to the same elements, and overlapping description will be omitted. According to the third modification illustrated in FIG. 14, even when the protective resin 64 of the IC module 60 has a large size in the XY plane direction, interference between the protective resin 64 and the support member 80 can be prevented.

Figure 15:
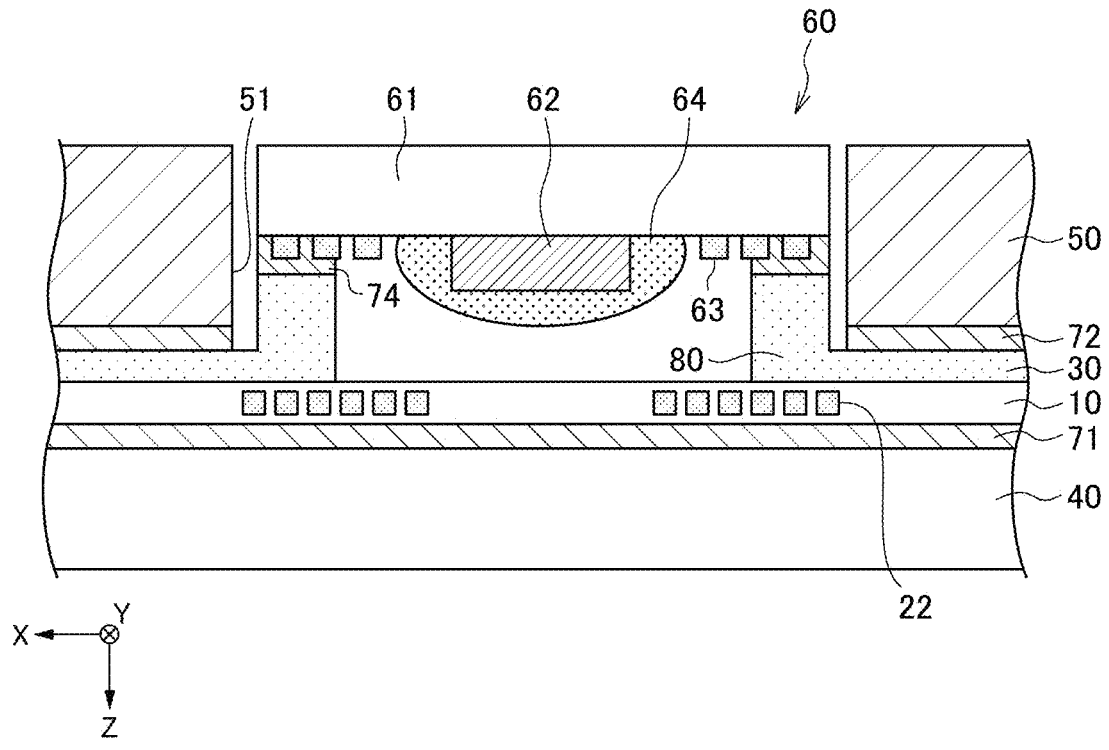
FIG. 15 is a schematic partial cross-sectional view illustrating a fourth modification of the IC module 60 and its surrounding structure.

FIG. 15 is a schematic partial cross-sectional view illustrating a fourth modification of the IC module 60 and its surrounding structure.

The fourth modification illustrated in FIG. 15 differs from the structure illustrated in FIG. 3 in that the adhesive layer 73 is omitted and that the support member 80 comes in contact with the magnetic body 30. That is, the outer peripheral wall of the support member 80 comes in contact with the inner peripheral wall of the through hole 31 of the magnetic body 30. Other basic configurations are the same as those of the structure illustrated in FIG. 3, so the same reference numerals are given to the same elements, and overlapping description will be omitted. In the fourth modification illustrated in FIG. 15, the support member 80 and magnetic body 30 may be integrally formed. When the support member 80 and magnetic body 30 are integrally formed, the number of components is reduced, and the positional relationship between the support member 80 and the magnetic body 30 can be fixed.

Figure 16:
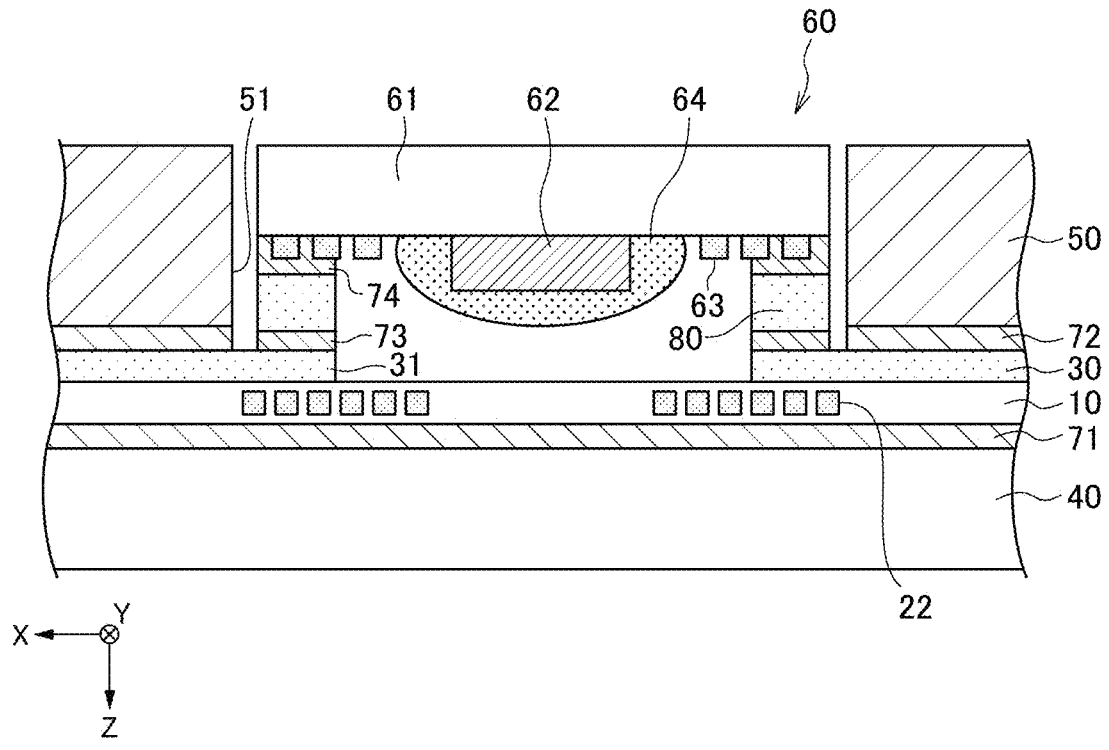
FIG. 16 is a schematic partial cross-sectional view illustrating a fifth modification of the IC module 60 and its surrounding structure.

FIG. 16 is a schematic partial cross-sectional view illustrating a fifth modification of the IC module 60 and its surrounding structure.

The fifth modification illustrated in FIG. 16 differs from the structure illustrated in FIG. 3 in that the support member 80 overlaps the magnetic body 30. The support member 80 and magnetic body 30 are bonded to each other through the adhesive layer 73 having a ring shape. Other basic configurations are the same as those of the structure illustrated in FIG. 3, so the same reference numerals are given to the same elements, and overlapping description will be omitted. In the fifth modification, like the magnetic body 30, the support member 80 may be a magnetic resin layer containing flat magnetic powder and binder resin. In this case, the flat magnetic powder and binder resin constituting the support member 80 may be the same as or different from those constituting the magnetic body 30. With this configuration, the support member 80 and magnetic body 30 are integrated through the adhesive layer 73, thereby reducing the number of components and allowing the positional relationship between the support member 80 and the magnetic body 30 to be fixed.

Figure 17:
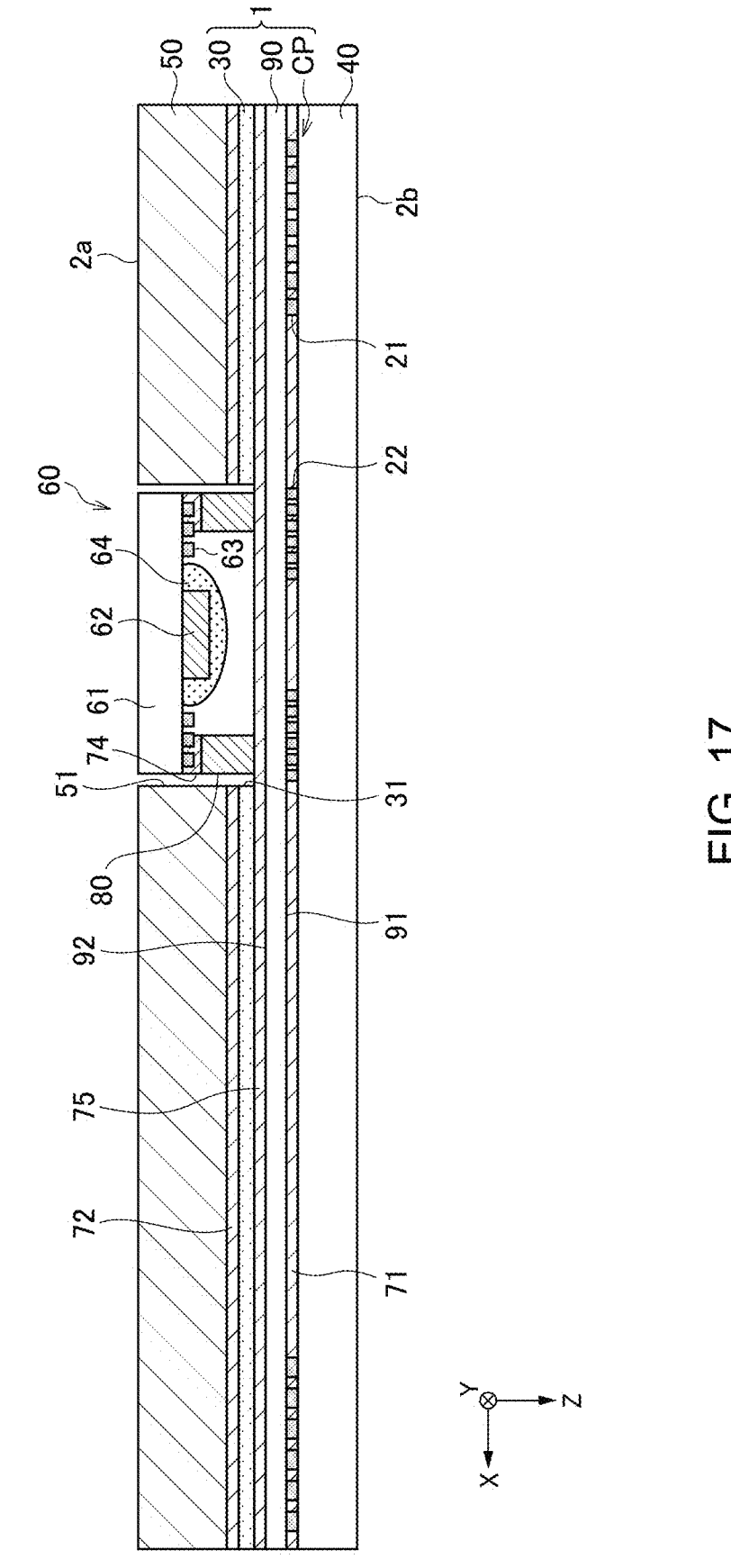
FIG. 17 is schematic cross-sectional view for explaining the structure of an IC card 2A according to a second embodiment.

FIG. 17 is schematic cross-sectional view for explaining the structure of an IC card 2A according to a second embodiment.

As illustrated in FIG. 17, the IC card 2A according to the second embodiment differs from the IC card 2 according to the first embodiment in that the coil pattern CP is provided on one surface 91 of a substrate 90 made of a PET film or the like. The other surface 92 of the substrate 90 is bonded to the magnetic body 30 through an adhesive layer 75. Other basic configurations are the same as those of the IC card 2 according to the first embodiment, so the same reference numerals are given to the same elements, and overlapping description will be omitted.

As exemplified by the IC card 2A according to the second embodiment, it is not essential for the coil pattern CP to be embedded in the resin layer 10, but the coil pattern CP may be provided on the surface 91 of the substrate 90 made of a PET film or the like. In the example illustrated in FIG. 17, the support member 80 is bonded to the adhesive layer 75.

Figure 18:
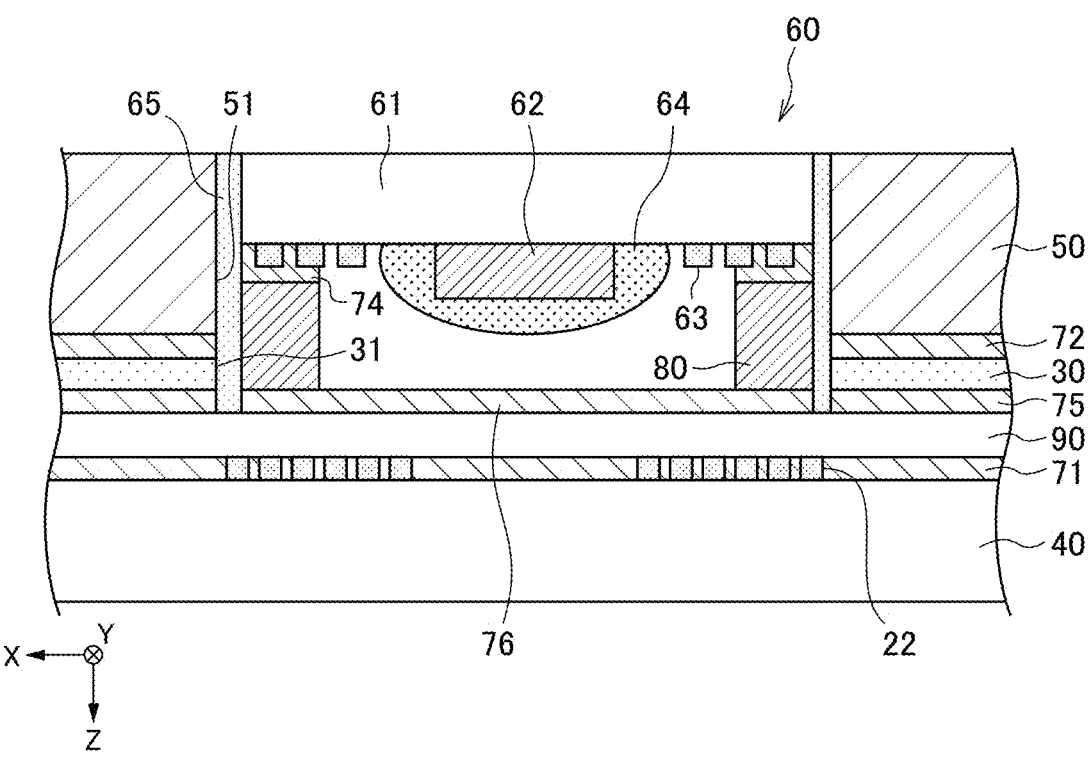
FIG. 18 is a schematic partial cross-sectional view illustrating a sixth modification of the IC module 60 and its surrounding structure.

FIG. 18 is a schematic partial cross-sectional view illustrating a sixth modification of the IC module 60 and its surrounding structure.

The sixth modification illustrated in FIG. 18 differs from the structure illustrated in FIG. 17 in that, at the region overlapping the through hole 51 of the metal plate 50 and the through hole 31 of the magnetic body 30, the adhesive layer 75 is removed, and instead, another adhesive layer 76 is provided, and that a resin member 65 is provided. Other basic configurations are the same as those of the structure illustrated in FIG. 17, so the same reference numerals are given to the same elements, and overlapping description will be omitted. According to the sixth modification illustrated in FIG. 18, different materials may be used for the respective adhesive layers 75 and 76, and the IC module 60 can be accommodated in the through hole 51 of the metal plate 50 after the adhesive layer 76 is bonded to the support member 80.

Figure 19:
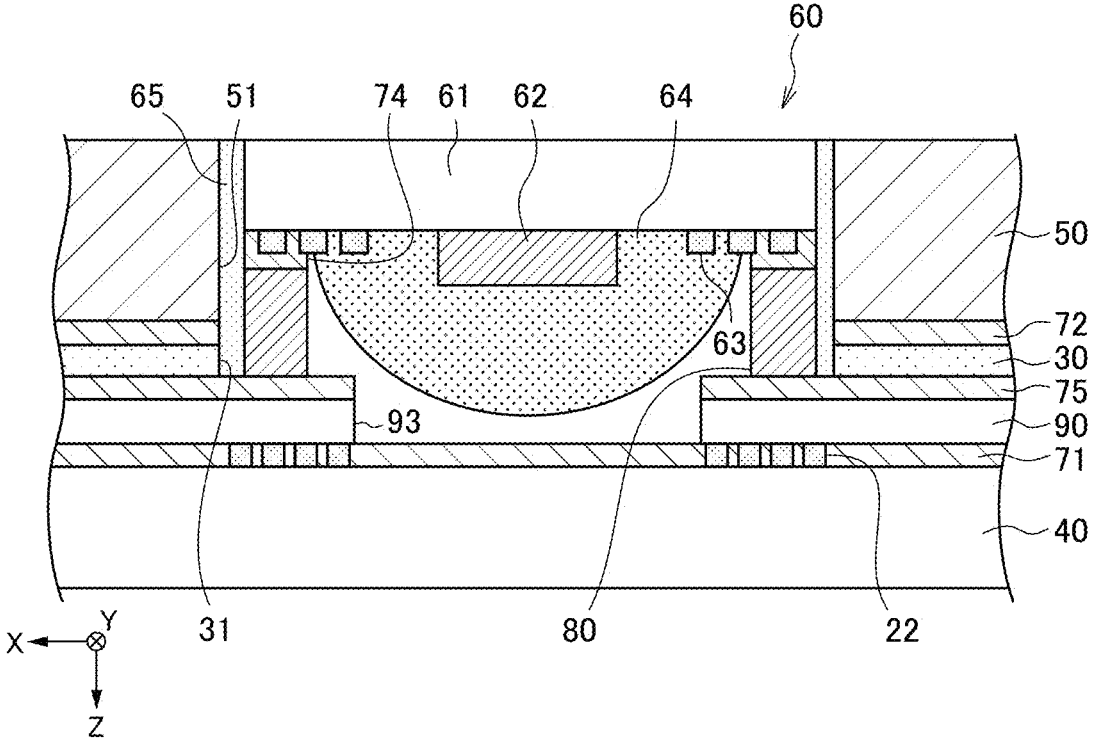
FIG. 19 is a schematic partial cross-sectional view illustrating a seventh modification of the IC module 60 and its surrounding structure.

FIG. 19 is a schematic partial cross-sectional view illustrating a seventh modification of the IC module 60 and its surrounding structure.

The fourth modification illustrated in FIG. 19 differs from the structure illustrated in FIG. 17 in that the adhesive layer 75 and substrate 90 are partially removed at the position overlapping, in a plan view, the opening region surrounded by the second winding part 22 of the coil pattern CP, and a resin member 65 is provided, and that the size of the protective resin 64 is increased. Other basic configurations are the same as those of the structure illustrated in FIG. 17, so the same reference numerals are given to the same elements, and overlapping description will be omitted. A through hole 93 formed in the substrate 90 overlaps the through hole 51 of the metal plate 50 and the through hole 31 of the magnetic body 30. According to the sixth modification illustrated in FIG. 19, even when the protective resin 64 of the IC module 60 has a large height in the Z-direction, interference between the protective resin 64 and the substrate 90 can be prevented.

While some embodiments of the technology according to the present disclosure have been described, the technology according to the present disclosure is not limited to the above embodiments, and various modifications may be made within the scope of the present disclosure, and all such modifications are included in the technology according to the present disclosure.

The technology according to the present disclosure includes the following configuration examples, but not limited thereto.

An IC card according to an embodiment of the present disclosure includes: a metal plate having a first through hole penetrating therethrough in the thickness direction; a support member disposed at least partially inside the first through hole; and an IC module supported inside the first through hole by the support member, wherein the IC module has a coupling coil, and the support member is made of a magnetic material and has a cavity penetrating therethrough in a thickness direction and accommodating a part of the IC module. With this configuration, the self-resonant frequency of the coupling coil can be reduced by the support member made of a magnetic material.

The above IC card may further include a coil pattern and a magnetic body located between the metal plate and the coil pattern in a thickness direction, the magnetic body may have a second through hole overlapping the first through hole, the coil pattern may include a first winding part overlapping the magnetic body and a second winding part connected to the first winding part and wound along the second through hole of the magnetic body, and the coupling coil of the IC module may be magnetically coupled to the second winding part of the coil pattern. This allows the IC module to communicate with an external card reader through the first winding part of the coil pattern.

The above IC cars may further include a resin layer supporting the coil pattern, and the resin layer may have a third through hole overlapping the first through hole and the second through hole. This makes interference between the IC module and the resin layer unlikely to occur.

In the above IC card, the inner peripheral edge of the second winding part of the coil pattern may overlap the cavity of the support member as seen from the thickness direction. This makes it possible to achieve magnetic coupling between the second winding part of the coil pattern and the coupling coil through the cavity of the support member.

In the above IC card, the outer peripheral edge of the second winding part of the coil pattern may be located outside the support member as seen from the thickness direction. This makes it possible to achieve magnetic coupling between the second winding part of the coil pattern and the coupling coil through the outer region of the support member.

In the above IC card, the support member may be made of a ferrite sintered body. This makes it possible to further reduce the self-resonant frequency of the coupling coil.

In the above IC card, the cavity of the support member may have a taper-shaped such that the inner diameter increases toward the IC module. This makes interference between the IC module and the resin layer even less likely to occur.

The above IC card may further include a resin member embedded in a gap between the metal plate and the support member inside the first through hole. This allows the support member to be fixed inside the first through hole and can enhance insulation between the metal plate and the support member.

What is claimed is:

1. An IC card comprising:
a metal plate having a first through hole penetrating therethrough in a thickness direction;
a support member disposed at least partially inside the first through hole; and
an IC module supported inside the first through hole by the support member,
wherein the IC module has a coupling coil, and
wherein the support member is made of a magnetic material and has a cavity penetrating therethrough in a thickness direction and accommodating a part of the IC module.

2. The IC card as claimed in claim 1, further comprising:
a coil pattern; and a magnetic body located between the metal plate and the coil pattern in a thickness direction,
wherein the magnetic body has a second through hole overlapping the first through hole,
wherein the coil pattern includes a first winding part overlapping the magnetic body and a second winding part connected to the first winding part and wound along the second through hole of the magnetic body, and
wherein the coupling coil of the IC module is magnetically coupled to the second winding part of the coil pattern.

3. The IC card as claimed in claim 2, further comprising a resin layer supporting the coil pattern,
wherein the resin layer has a third through hole overlapping the first through hole and the second through hole.

4. The IC card as claimed in claim 2, wherein an inner peripheral edge of the second winding part of the coil pattern overlaps the cavity of the support member as seen from the thickness direction.

5. The IC card as claimed in claim 2, wherein an outer peripheral edge of the second winding part of the coil pattern is located outside the support member as seen from the thickness direction.

6. The IC card as claimed in claim 1, wherein the support member is made of a ferrite sintered body.

7. The IC card as claimed in claim 1, wherein the cavity of the support member has a taper-shaped such that an inner diameter increases toward the IC module.

8. The IC card as claimed in claim 1, further comprising a resin member embedded in a gap between the metal plate and the support member inside the first through hole.

* * * * *